Nov. 28, 1933.    A. APEL    1,936,613
COMBINE
Filed May 16, 1932    3 Sheets-Sheet 1
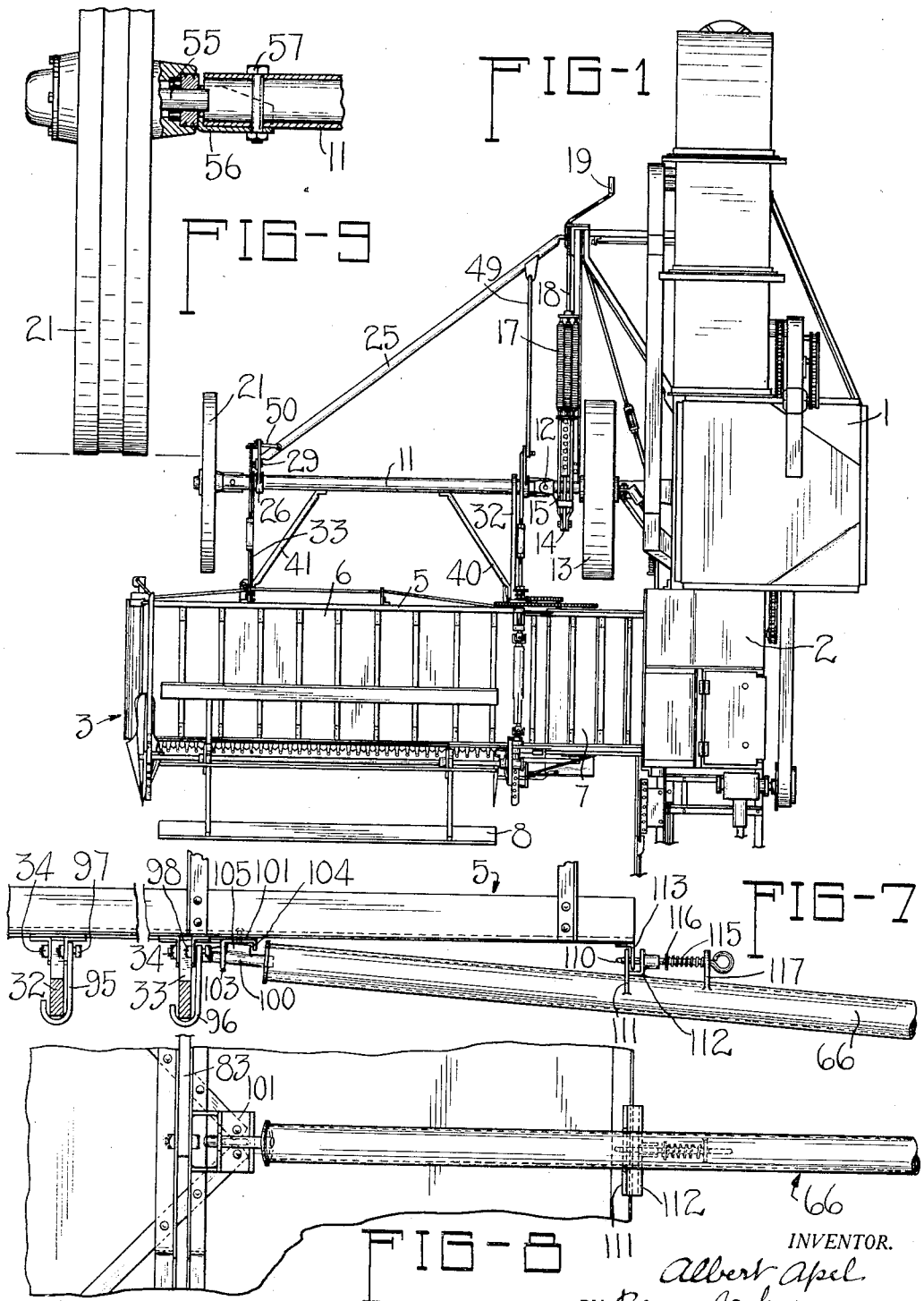
WITNESS
WALTER ACKERMAN
INVENTOR.
Albert Apel.
BY Brown, Jackson
Boettcher & Dienner
ATTORNEY.

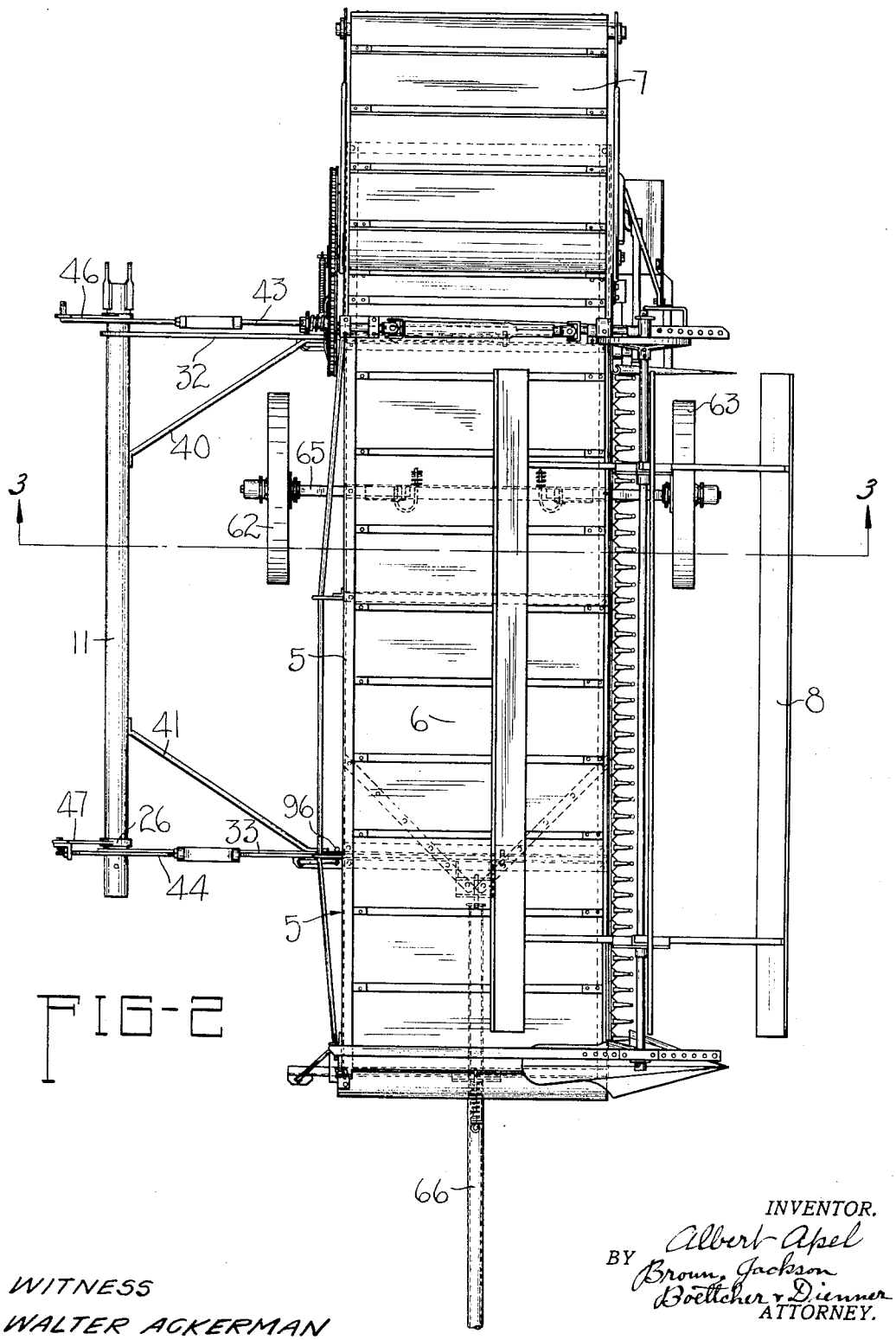

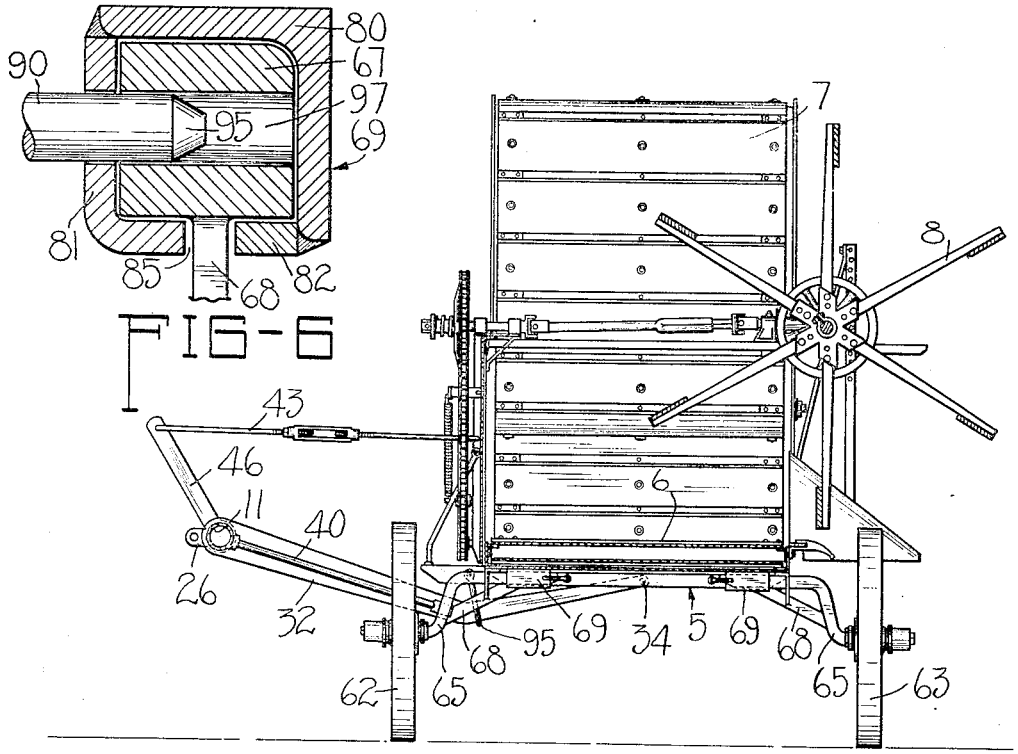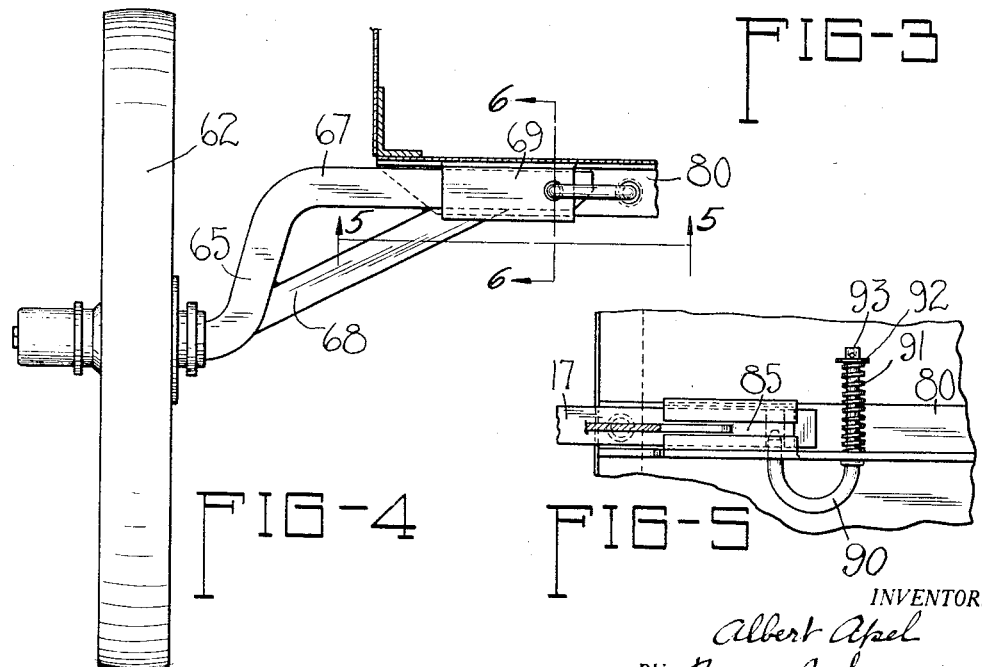

Patented Nov. 28, 1933

1,936,613

UNITED STATES PATENT OFFICE 1,936,613

COMBINE

Albert Apel, Moline, Ill., assignor to Deere & Company, Moline, Ill., a corporation of Illinois Application May 16, 1932. Serial No. 611,559

8 Claims. (Cl. 56—20)

The present invention relates generally to agricultural implements, particularly to such implements or machines as combines, and is particularly concerned with a new and improved manner and means for arranging the machine for transport.

In such agricultural machines as combines and the like there is generally provided some form of harvesting or operating unit which projects laterally for some distance with respect to some other part of the machine such as, in the case of combines, a thresher unit. When such a machine is to be transported it is quite desirable to materially reduce the overall width of the machine so that the same can conveniently be transported from one field to another, through gates, narrow lanes and along roads and highways.

Heretofore such reduction of the overall width of these machines has been effected by detaching the laterally projecting unit and arranging the same for transport in a trailing position in rear of the remainder of the machine. In the case of combines, the harvester unit, that is, the laterally projecting platform and reel structure, has been detached and mounted upon a wheel supported transport truck with one end of the operating unit connected with or supported upon the thresher unit of the combine. Generally this last named step has been accomplished by providing such sort of draft member connected with the wheel supported transport truck at one end and at its other end the draft member is connected with the thresher unit.

In such machines as combines embodying laterally projecting harvesting units as mentioned above, it is generally customary to provide some form of laterally projecting supporting member upon which the operating parts of the harvester unit can be supported, and in arranging these machines for transport, particularly where the platform and associated structure of the harvester unit are pivotally or otherwise movably connected with the laterally extending supporting member, means must also be provided to carry the supporting member. This has heretofore been accomplished by carrying the supporting member upon the transport truck.

Heretofore, these transport trucks have embodied a considerable number of parts and which necessarily have been made rather heavy in order to carry the entire weight of the harvester unit and the associated supporting member therefor.

Having in mind these factors, the present invention has for its principal purpose the provision of a new and improved manner and means for arranging such agricultural machines for transport which involves only a very small number of parts and which are easily and conveniently attached and removed. More specifically, the present invention contemplates the provision of one or more transport wheels, each provided with its own stub axle, and a draft member in the form of a draft tongue, all adapted to be separately connected with the frame of the operating unit, in connection with means for detachably carrying the supporting member which normally projects laterally from the thresher unit and supports the platform and reel unit.

Other objects of the present invention include new and improved mountings for the axles of the transport wheels by which the harvester or platform and reel unit is supported thereon, and a new and improved of draft tongue separate from the transport wheels and directly connected with the platform or harvester unit.

These and other objects and advantages of the present invention will be apparent from the following detailed description of the preferred structural embodiment, taken in conjunction with the accompanying drawings illustrating such embodiment, in which:

Figure 1 is a top plan view of an agricultural implement in the form of a combine embodying the principles of the present invention;

Figure 2 is a top plan view of the platform unit when separated from the thresher unit of the combine and arranged for transport, Figure 2 being on a somewhat larger scale than Figure 1;

Figure 3 is a cross sectional view taken along the line 3—3 of Figure 2;

Figure 4 is an enlarged detailed view, partly in section and partly in elevation, showing the attachment of the transport wheels and stub axles to the frame of the platform unit;

Figure 5 is a view illustrating the attachment of the transport axle to the platform and looking upwardly along the arrows 5—5 in Figure 4;

Figure 6 is an enlarged cross sectional detail taken along the line 6—6 of Figure 4;

Figure 7 is a fragmentary side elevation, certain parts being shown in section, illustrating the attachment of the transport tongue to the frame of the platform;

Figure 8 is a fragmentary view looking upwardly toward the transport tongue shown in Figure 7; and Figure 9 illustrates the detachable connection of the outer or grain wheel with the laterally outer end of the supporting member for the platform of the combine.

Referring now more particularly to Figure 1, it will be observed that I have chosen to illustrate the present invention as embodied in a combine including a grain tank 1, a thresher unit 2 and a harvester unit 3. The harvester unit 3 is representative of any form of laterally projecting operating unit carried by an agricultural machine and includes a suitable framework 5 on which is mounted a platform conveyor 6, an upwardly extending conveyor 7 leading into the feeder house of the thresher unit 2 and a reel 8, together with suitable operating mechanism for these parts.

The platform 5 and associated structure are connected in laterally extending relation with the thresher unit 2 by means of a supporting member in the form of a pipe 11. This member is connected with the thresher unit 2 through a universal joint 12 the inner section of which is journaled upon the outer end of the axle of the thresher unit, just outside the supporting wheel 13 for the thresher unit. The inner section of the universal joint 12 includes an arm 14 which is connected by means of links 15 to one end of an assembly of balancing springs 17. The other end of the spring assembly 17 is threadedly connected with an adjusting screw 18 including an operating crank 19, the adjusting screw being suitably anchored to the main frame of the thresher unit, whereby angular displacement of the universal joint 12 and the balancing arm 14 is resisted by the tension of the springs 17.

The inner end of the lateral supporting member 11 is connected to the universal joint 12 while the outer end thereof is supported by means of an outer or grain wheel 21. The supporting member 11 is braced by a diagonal brace pipe 25, one end of the latter being suitably anchored to the main frame of the thresher unit while the opposite end is connected with the outer end of the supporting member 11 by any suitable means. Preferably the connections between the diagonal member 25 and the main frame of the thresher unit and the supporting member 11 are detachable, the detachable connection between the diagonal brace bar 25 and the outer end of the lateral supporting member 11 being effected by a suitable bracket 26 to which the end of the diagonal brace pipe is bolted, as indicated by the reference numeral 29. The universal joint 12 also comprises separable parts connected together by bolt means or other means capable of being detached.

The platform 5 and associated structure is normally, when the machine is in operation, carried for pivotal movement about an axis on supporting arms 32 and 33, the forward ends of which are pivoted to the frame of the platform 5, as indicated by the reference numeral 34 in Figure 6, while the other end of each of the supporting arms 32 and 33 is rigidly connected with the supporting pipe 11. In this way the weight of the platform 5 is normally balanced by the springs 17, since the weight of the platform normally tends to swing the supporting arms 32 and 33 downwardly about a transverse axis, which rocks the supporting member 11 and the balancing arm 14, this movement being resisted by the tension in the springs 17. The magnitude of the tension in these springs can be adjusted by rotating the crank 19. The supporting arms 32 and 33 are reinforced by suitable braces 40 and 41, and the platform 5 is steadied upon its pivotal support by means of adjustable links 43 and 44 the inner ends of which are connected directly to the platform while the other ends are connected to arms 46 and 47 journaled on the supporting member 11. These arms are, in turn, braced by rearwardly extending rods 49 and 50 connecting the arms 46 and 47 with the diagonal brace member 25. The outer arm 47 is connected to the collar 26 to which the laterally outer end of the diagonal brace member 25 is bolted.

I have described above the supporting means for the platform when the latter is arranged for operation. When the machine is to be transported it is desirable to detach the platform 5 and the supporting means therefor so as to materially reduce the overall width of the machine, and in order to arrange the machine for transport it then becomes necessary to provide means for supporting the platform and other parts removed in such a manner that they can be drawn behind the thresher unit when the latter is transported.

The supporting means for the platform 5 can be detached from the frame of the thresher unit 2 by removing the bolt which holds the two parts of the universal joint 12 together and by disconnecting the bolts which connect the rear end of the diagonal brace member 25 with the frame of the thresher unit. It is preferable, however, before these parts are detached to release the tension of the springs 17 by turning the crank 19 in the proper direction, and before this is accomplished it is desirable to provide some form of support for the platform 5, such as blocks or the like so that when its supporting means is detached the platform will be disposed in a position enabling the convenient attachment of the transport means which will be described in detail later.

After the diagonal bar 25 and the supporting member 11 has been detached from the main frame of the thresher unit 2 the diagonal brace bar 25 is detached from the supporting member 11 by releasing the bolt means 29 and detaching the brace rods 29 and 50. It is also desirable at this time to detach the grain wheel 21. As best shown in Figure 9 this wheel is carried upon a spindle 55 which is secured to a saddle 56, the latter being detachably connected to the outer end of the support 11 by bolt means 57. When the bolt 57 is detached the wheel 21 and spindle 25 may be removed from the support 11. In order to permit the convenient attachment of the transport wheels and associated structure it may be necessary before the supporting pipe 11 and brace member 25 are detached to raise the platform 5 slightly above its normal position so that sufficient blocking may be had to maintain the platform at a height sufficient to provide for the convenient attachment of the transport wheels.

The present invention is primarily concerned with the provision of a simple and inexpensive means for supporting the platform during transport. This means will now be described. By the present method, only two wheels 62 and 63, each having a short stub axle 65, and a relatively short draft member or transport tongue 66 are necessary. Referring more particularly to Figures 3 and 4, each of the stub axles 65 has an upwardly and inwardly extending portion 67 forming an axle shank of square cross section, the transport wheels being journaled on the lower or journal portions of the axles 65. The journal portion and the shank portion of each axle is suitably braced by a bar 68 arranged diagonally as best shown in Figure 4.

The stub axles 65 are entirely separate and distinct from one another and are separately connected with the frame of the platform 5. For removably receiving the axles 65 the platform 5 is provided with a pair of sockets or sleeves 69 into which the shank portion 67 of the axles are disposed. In order to prevent the axles 65 from rotating in their mountings the shanks 67 are preferably of square cross section, see Figure 6, and the axle receiving openings of the sleeves 69 are similarly formed square in cross section. The sockets or sleeves 69 are formed in the following manner. The platform frame 5 includes a transverse angle bar 80 and to this member a depending plate 81 is rigidly secured, as by welding or the like, the plate 81 being preferably secured to the upper edge of the angle iron 80. A small strip 82 is welded to the edge of the depending flange of the angle iron 80 and the lower edge of the plate 81 is bent inwardly in spaced relation with respect to the strip 82 to provide a slot 85 to receive the brace member 68. The sleeves 69, as best shown in Figure 3, are arranged one adjacent each side of the platform 5 and are disposed adjacent to the longitudinal members constituting, together with the transverse frame member, the framework of the platform 5. The slot 85 may or may not extend the entire length of the sleeves 69.

The axles 65 of the transport wheels are adapted to be readily inserted into and removed from the sleeves 69. In order to detachably secure the axles within these sleeves the present invention contemplates providing spring pressed plungers or latch members in the form of U-bars having one end adapted to be projected into registering openings formed in the sleeves and in the cooperating portions of the axles. As best shown in Figures 4 and 5 each of these latch members comprises a rod 90 bent in the form of a U, one end being somewhat longer than the other. The long end of the U-shaped latch 90 is received within an opening formed in the vertical flange of the transverse frame bar 80 and a spring 91 is mounted on this end of the latch 90, being biased between the flange of the angle bar 80 and a washer 92 held onto the end of the latch 90 by means of a pin 93 or the equivalent. The other end of the U-shaped latch is pointed, as indicated in Figure 6 by the reference numeral 95, and this end is adapted to be projected through an opening 96 formed in the plate 81 and an opening 97 formed in the inner end of the shank 67 of the axle 65. As is apparent, when the openings 96 and 97 are in registry the spring 91 is operative to move the end 95 into the opening 97 in the axle, thereby effectively securing the axle in its mounting sleeve. Since the mounting for each of the transport wheels 62 and 63 is the same a description of one of them will suffice.

Mention has been made above that the present invention contemplates carrying the supporting pipe 11 upon the frame of the platform when the latter is arranged for transport. The means provided for this purpose is best shown in Figures 6 and 7. It will be remembered that the bars 32 and 33 are pivotally connected at their forward ends with the platform 5 and are rigidly connected at their rear ends with the supporting member 11. To carry the member 11 on the platform, a pair of links or hooks 95 and 96 are provided. These hooks 95 and 96 are pivotally connected to certain of the transverse frame bars making up the frame of the platform by means of bolts 97 and 98. Any form of means for pivotally connecting the hooks with the frame of the platform is sufficient, provided sufficient looseness is present to allow the hooks to be engaged underneath the lower edges of the arms 32 and 33, as indicated in Figure 7. Obviously, when these hooks are engaged underneath the arms 32 and 33 downward swinging of the arms relative to their pivotal connection with the platform will be prevented and the supporting member 11 thus carried in a simple and sturdy manner.

Referring now more particularly to Figure 2, it will be observed that the transport wheels 62 and 63 with their axles 65 are disposed intermediate the ends of the platform 5 and are somewhat nearer one end thereof than the other. This throws a slight preponderance of weight on the latter end of the platform. This is the end, therefore, to which it is desirable to connect the transport tongue or draft member 66. The tongue 66, as best shown in Figures 7 and 8, comprises a length of pipe or tubular stock having a pin 100 fixed to the end thereof. The pin 100 therefore serves as a reduced end of the draft tongue 66 and is adapted to be interengaged with certain parts of the platform 5. For this purpose the platform carries a bracket 101, preferably secured to one of the transverse frame bars, and this bracket includes a pair of spaced ears 103 and 104, the former being apertured to receive the pin 100. The bracket 101 may be secured to the platform by riveting, welding or the like. A small lug 105 is welded to the top of the pin 100 and is received between the spaced ears 103 and 104, the purpose of the lug being to hold the tongue 66 against endwise movement with respect to the platform and to transmit draft thereto when the tongue is in position.

The transport tongue 66 is applied by first inserting the reduced end 100 in the aperture in the flange 103 and then rotating the tongue until the lug 105 is disposed between the ears 103 and 104. To hold the tongue in this position a spring latch is provided which comprises a rod or plunger 110 slidably supported in aligned perforations in lugs or brackets 111 and 112 welded or otherwise secured to the top of the tongue 66. The brackets 111 and 112 are so disposed longitudinally of the tongue and relative to the pin 100 that they lie on opposite sides of a depending flange of one of the transverse angle irons 113 constituting the frame of the platform 5. A hole is provided in the flange of the frame member 113 for the reception of the pin or plunger 110. The latch is normally held in position with the pin engaging the opening in the frame member 113 by means of a compression spring 115 disposed between a washer 116 on the rod 110 and a lug 117 welded or otherwise secured to the tongue, this lug also having an opening slidably receiving the rod 110. As is apparent, when the rod 110 engages the frame member 113 the tongue 66 is held in position and cannot rotate enough to free the lug 105 from between the bracket ears 103 and 104. When it is desired to detach the transport tongue 66 it is a simple matter to pull the rod 110 out of the opening in the frame member 113 and then rotate the tongue 66 sufficiently to release the lug 105. Then the tongue may be drawn from the opening in the apertured bracket 101.

The operation is believed to be apparent from the above description. The machine is shown in Figure 1 as arranged for operation in the field. When the machine is to be arranged for transport, the members 11 and 25 are disconnected from the thresher unit 2 after first blocking up the platform 5 and releasing the tension in the springs 17. Next the hooks 95 and 96 are engaged underneath the arms 32 and 33, it being a relatively simple matter to accomplish this after first detaching the grain wheel 21 and the diagonal brace member 25 from the supporting member 11 and slightly raising the latter to permit the hooks 95 and 96 to engage the lower edge of the arms 32 and 33.

If desired, the pipe member 11 and the arms 32 and 33 can be carried separately by disconnecting the latter from the platform by removing the pivot bolts 34. Then by detaching the links and the diagonal brace 25, the pipe member 11 can be carried on the thresher by swinging the same around approximately 90 degrees without disconnecting it from the universal joint 12. It should also be noted that, if desired, after disconnecting the harvester platform 5 by removing the bolts 34 and disconnecting the links 43, the transverse pipe member 11, with the diagonal member 25 left connected to it and with the grain wheel 21 left in position, could be swung upwardly as a unit about an axis passing through the universal joint 12 and the pivotal connection of the rear end of the diagonal brace member 25 with the thresher frame and into a vertical plane.

After the pipe member 11 has been positioned as outlined above, the transport wheels 62 and 63 are attached to the sides of the platform by inserting the axles, respectively, into the mounting sleeves 69 until the openings 96 and 97 are in registry. When this is done the latches 90 can be engaged in these openings, whereupon the transport wheels will be detachably but securely fastened to the platform to support the same during transport. The transport tongue 66 is conveniently attached by first inserting the reduced end 100 into the opening in the ears 103 and then rotating the tongue to bring the draft transmitting lug 105 in between the ears on the bracket 101. To hold the tongue in this position the latch 110 is inserted in the opening in the transverse frame member 113. The forward end of the tongue is then secured in any manner desired to the rear end of the thresher unit 2, whereupon the entire machine can conveniently be transported from one field to another and through narrow gates, lanes and the like.

While I have shown and described in detail the preferred structural embodiment of the present invention, it will be apparent to those skilled in the art that my invention is not to be limited to the specific means shown and described but that, in fact, widely different means may be employed in the practice of the broader aspects of my invention.

What I claim, therefore, and desire to secure by Letters Patent is:

1. In a combine having a thresher unit and a detachable platform, means for arranging the combine for transport comprising a pair of transport wheels, one adapted to be connected to each side of the platform, a stub axle for each of said wheels comprising a journal portion and an upwardly extending section, downwardly extending brace means for each of said stub axles, a laterally extending sleeve secured to the underside of the platform adjacent each side thereof and extending generally laterally thereof, said sleeves being adapted to receive said axle sections in non-rotatable relation, and each of said sleeves having a slot to receive said brace means, latch means for securing said axles in said sleeves, and a draft tongue separate from said axles and adapted to be removably connected with one end of the platform to connect the latter with the thresher unit.

2. In a combine having a detachable platform, means for arranging the latter for transport comprising at least one transport wheel, a stub axle therefor, said axle having a shank portion and a downwardly extending journal portion adapted to rotatably receive the transport wheel, a diagonal reenforcing bar connecting said journal portion with said shank portion, the latter being square in cross section, means on the platform providing a sleeve having a square opening therethrough to receive the shank of the axle in non-rotatable relation, there being a slot formed in said sleeve to accommodate the diagonal brace member, and a spring pressed pin adapted to pass through openings formed in said sleeve and in the axle to detachably secure the latter to the platform.

3. In a combine, a thresher unit, a platform, a laterally extending detachable supporting member for the platform, means for movably supporting the platform on said member, and means for arranging said combine for transport comprising a plurality of transport wheels, stub axles therefor, means adapted to connect said axles with the platform, and means for fixing said supporting member to the platform to support the former by the latter during transport.

4. In a combine having a thresher unit, a platform, a laterally extending detachable supporting member for the platform, arms carried by said supporting member, and means for movably supporting the platform on said arms, means for arranging said combine for transport comprising ground engaging supports detachably connected with said platform, and means carried by said platform and engageable with said arms to connect said supporting member with the platform to support said member by the latter during transport.

5. In a combine having a thresher unit, a platform, a laterally extending supporting member for the platform, a plurality of arms rigidly carried by said member, means pivotally supporting the platform on said arms, and means detachably connecting said laterally extending supporting member with the thresher unit, means for arranging said combine for transport comprising a pair of transport wheels, stub axles upon which said wheels are journaled, means detachably connecting said axles with the sides of said platform, means carried by said platform at one side thereof and adapted to engage said arms to hold said supporting member when the latter is disengaged from the thresher unit, and a detachable draft member removably connected with said platform and adapted to be connected to the rear end of said thresher unit.

6. In an agricultural machine having a thresher unit, a platform and reel unit, a laterally extending member for supporting said platform, and means detachably connecting said member with the thresher unit at one side thereof, means for arranging said machine for transport and to reduce the width thereof, said means comprising a pair of supporting wheels for one end of the platform unit, means supporting the other end of said platform unit on said thresher unit, and means for carrying said supporting member upon said platform and reel unit.

7. In an agricultural machine embodying an operating unit having a frame with transverse and longitudinal angle bars, means for supporting said unit for transport comprising at least one transport wheel, a stub axle therefor, an angle bar section connected with one of said frame bars and cooperating therewith to form a polygonal axle receiving sleeve adapted to receive one portion of said stub axle, and means for detachably securing said axle in said sleeve.

8. In an agricultural machine embodying an operating unit having longitudinal and transverse frame bars, means for arranging said operating unit for transport comprising a pair of transport wheels disposed adjacent said longitudinal frame bars, stub axles for said wheels, each of said stub axles including a journal portion and a shank portion, means rigidly connected with one of said transverse frame bars and cooperating therewith to form a pair of axle receiving sleeves adapted to receive the shank portions of said axles, registering openings formed in said sleeves and said shank portions, and spring pressed plungers carried by said operating unit and adapted to be projected through said registering openings to removably secure said axles in said sleeves, each of said spring pressed plungers comprising a U-shaped member having one portion movably carried by said transverse frame bar and the other portion formed to engage in said registering openings and spring means biased between said transverse frame bar and the end of said first mentioned portion.

ALBERT APEL.